United States Patent [19]

Ivarsson et al.

[11] Patent Number: 4,806,168

[45] Date of Patent: Feb. 21, 1989

[54] REFRACTORY MATERIAL AND ITS USE

[75] Inventors: Lennart Ivarsson, Höganäs; Rolf Lundqvist, Gothenburg, both of Sweden

[73] Assignees: Höganäs AB, Höganäs; Nordsec Security AB, Gothenburg, both of Sweden

[21] Appl. No.: 68,720

[22] Filed: Jun. 30, 1987

Related U.S. Application Data

[63] Continuation of Ser. No. 760,895, Jul. 31, 1985, abandoned.

[30] Foreign Application Priority Data

Aug. 7, 1984 [SE] Sweden .............................. 8404002
May 15, 1985 [SE] Sweden .............................. 8502429

[51] Int. Cl.$^4$ .............................................. C04B 7/32
[52] U.S. Cl. ..................................... 106/104; 106/99; 109/83; 501/87; 501/88; 501/95; 501/103; 501/106; 501/124
[58] Field of Search ................. 106/99, 104; 109/83; 501/103, 95.124, 87, 88, 106

[56] References Cited

U.S. PATENT DOCUMENTS

| | | | |
|---|---|---|---|
| 3,992,214 | 11/1976 | Petrak et al. | 106/104 |
| 4,014,704 | 3/1977 | Miller | 106/38.22 |
| 4,366,255 | 12/1982 | Lankard | 106/104 |
| 4,377,977 | 3/1983 | Wurster | 109/83 |
| 4,513,040 | 4/1985 | Lankard | 106/97 |

FOREIGN PATENT DOCUMENTS

| | | | |
|---|---|---|---|
| 2398167 | 3/1979 | France | 106/104 |
| 53-17623 | 2/1978 | Japan | 106/104 |
| 82008624 | 2/1982 | Sweden . | |
| 2093010 | 8/1982 | United Kingdom . | |

*Primary Examiner*—Mark L. Bell
*Attorney, Agent, or Firm*—Burns, Doane, Swecker & Mathis

[57] ABSTRACT

Refractory material based on grog and hydraulic or chemical binder. The refractory material contains a substantially evenly distributed content of a heat-resistant fiber reinforcement and cutting-material in individual pieces; the use of such refractory material as a constructional material in units for storing valuables, such as bank vaults, safes and the like; and a unit for storing valuables including such refractory material.

14 Claims, No Drawings

REFRACTORY MATERIAL AND ITS USE

This application is a continuation, of application Ser. No. 760,895, filed July 31, 1985 abandoned.

The present invention relates to a new refractory material based on grog and hydraulic binder and the use of said material as a construction material in units for storing valuables, such as bank vaults, safes etc.

When dealing with breaking-in safe and firesafe storage of valuables of different types, such as cash money, irreplaceable documents or other valuables, quite high international requirements are put on the arrangement of the storage site. Thus, there is required for a unit for storing valuables, such as for example a bank service box, breaking-in safety against every type of damage. Thus, the storage unit shall possess breaking-in safety against damage by impact, drilling, cutting with different types of cutting tools, such as a welding torch or an oxygen gas torch, blasting, chiselling etc. In addition to breaking-in safety the storage unit must also impart fire protection to a necessary extent.

Known units for storing valuables are usually made from steel or other metal alloys or from reinforced concrete, optionally provided with different additives which increase the strength. Common to all known units for storing valuables is, however, that they do not give satisfactory breaking-in safety for all types of damage in the different forms as presented above. Thus, there is presently a demand for new breaking-in safe materials which at the same time give satisfactory fire protection.

The present invention provides for a new material which in a surprising manner shows a high degree of breakingin safety and which, furthermore, by its insulating capacity gives a satisfactory fire protection. In accordance with the present invention there is thus provided a new refractory material which is based on a refractory matrix of refractory grains or particles as a filler, such as grog and a hydraulic or chemical binder. These components in the refractory material according to the invention are wholly conventional in a nature. The material according to the invention additionally includes on the one hand a heat-resistant fibre reinforcement, and on the other hand a cutting resistant hard material in the individual pieces, and said two later components are essentially evenly distributed in the refractory matrix.

It has now suprisingly been found in practical testing of this refractory material that in addition to the fire resistance it shows a high degree of toughness making the material breaking-in safe against damage by impact, blasting or chiselling. This property of the material is essentially ascribable to the heat-resistant fibre reinforcement. By the contents of cutting-resistent material arranged in the refractory matrix in individual pieces essentially evenly distributed the material obtains a high cutting resistance.

The invention also includes the use of such refractory material as a construction material in units for storing valuables, such as bank vaults, safes, bank service boxes and similar units.

As previously indicated the construction of the refractory matrix based on a so called grog and binder is conventional per se as to its character. The grog may in a traditional way consist of grains or particles of refractory materials, such as alumina, bauxite, kaolin, aluminum silicate, chromite, zirconium, zirconia, olivine and the like. A particularly preferred material is $\alpha$-corundum, so called tabular alumina. As a binder there may advantageously be used calcium-aluminate cement, phosphoric acid or phosphate, silicate cement or colloidal silica or mixtures or one or several of these.

The heat-resistant fibre reinforcement present in the refractory material according to the invention can be constituted by steel fibres or carbon fibers. The fibre reinforcement is present in the material in an amount of suitably up to about 10% by weight and it is preferably constituted by fibres having a length of up to about 10 cm, for example from about 2 to about 5 cm, and a thickness of about 0.1 to about 0.5 mm, for example about 0.2–0.3 mm. As previously indicated this fibre reinforcement has for its function to impart satisfactory tensile strength to the refractory material so that it can resist damage by for example impact, blasting or fall from a high level. The material of the fibre reinforcement shall possess the necessary heatresistance, which means that it should endure a temperature of several hundred degress Celsius. In view of the low heat conductivity of the refractory material the fibre reinforcement need not for obtaining heat-resistance withstand an essentially higher temperature.

The cutting resistant material distributed in the refractory material can be any non-reactive material having a high cutting resistance. It has suitably a hardness according to the Mohs' scale of at least about 7. (Re. the hardness scale see Handbook of Chemistry and Physics, page 1424, 39:th edition, Chemical Rubber Publishing Co., Cleveland, Ohio, USA). Among suitable materials there may be mentioned materials based on $Al_2O_3$, for example Corhart-Zac ($Al_2O_3.ZrO_2$), abrasite ($\alpha$-corundum), $\beta$-corrundum, melted nullite ($3Al_2O_3.2SiO_2$), andalusite ($Al_2O_3.SiO_2$) etc. Another conceivable material is minerals of the emery type, such as corundum, magnetite, hematite, quartz and spinel. Also certain types of hard metal scrap are conceivable, for example originating from coromant manufacture. All these materials have a hardness lying within the range about 7–9.

Other types of materials are carbides, such as silicon carbide, boron carbide, zirconium carbide, hafnium carbide, tantalum carbide, chromium carbide, tungsten carbide, vanadium carbide or molybdenum carbide. All these carbides are quite high-melting and very hard. Also a mixed carbide is conceivable, such as tungsten-titanium carbide, known under the name Kennametal which is also used as a hard metal in cutting tools. Particularly preferred are, however, silicon carbide and boron carbide, especially the former.

Further conceivable hard materials are nitrides, for example boron nitride, aluminum nitride and silicon nitride, and borides, for example chromium boride, molybdenum boride and tungsten boride.

As previously mentioned the cutting-resistant material is arranged in the form of individual pieces substantially evenly distributed in the refractory matrix. These pieces have suitably an average cross dimension of at least about 5 mm, and the cross dimension lies suitably within the range about 5 to 20 mm, and particularly about 10 to 15 mm. The quantity of pieces present in the material is not particularly critical but it should be sufficiently large so as to impart the necessary breaking-in safety against for example cutting. However, the piece-formed material should be present in the refractory material in a quantity which based on volume is less than the material as a whole. A suitable quantity is up to about 20% by weight and is preferably no less than about 5% by weight.

A conceivable practical example on the manufacture of a unit for storing valuables, for example a safe, from a refractory material according to the present invention will now be described. However, this example must not be considered as limiting.

A suitable casting mass for the manufacture of a refractory material is mixed with a quantity of water suitable for casting, for example 5-8% by weight. The casting mass may for example as a refractory matrix consist of about 70% by weight of α-corundum as grog and about 30% by weight of calcium-aluminate cement as a binder, together with fibre reinforcement and suitable material pieces evenly distributed in the matrix. As a casting mould there is used a metal box corresponding to the shape of the safe, the box proper being manufactured separately, optionally also its lid separately and its door separately. The two parts of the box are placed on a vibrating table affected by high frequency vibrators. The moistened casting mass is then continuously introduced at a suitable place in the parts of the box so as to displace the air from the interior spaces of the box and to avoid air pockets. When the mass completely fills up the interior of the box parts vibration is performed for another few minutes for complete removal of the air and for obtaining maximum density of the casting mass.

The box parts are then dried at an increased temperature, for example 110° C. for 24 hours, the refractory material setting to the necessary strength.

After hardening of the refractory material the casting mould, i.e. the metal mantle may then be removed, but from an estetical point of view and for example painting purposes the metal mantle can be maintained in connection with using the box.

The invention will in the following be further described in connection to non-limiting specific examples.

EXAMPLE 1

Casting mass of physical-chemical bond

A casting mass of the LCC-type ("low cement content") was prepared by dry mixing of the following constituents:

| | | |
|---|---|---|
| Tabular alumina (high sintered $Al_2O_3$) | 5-0 mm | 55 parts by weight |
| Tabular alumina (high sintered $Al_2O_3$) | <14 mesh | 17 parts by weight |
| Tabular alumina (high sintered $Al_2O_3$) | <48 mesh | 10 parts by weight |
| Calcined alumina | <230 mesh | 15 parts by weight |
| Secar 70 (calcium-aluminate cement) | | 3 parts by weight |
| Colloidal silica (Ludox HS40) | | 11 parts by weight |

In the casting mass formed by mechanical mixing of the above constituents there is then admixed 11 parts by weight of silicon carbide pieces having a cross dimension lying within the range about 5-10 mm and 5.5 parts by weight of steel fibres having a length of about 50 mm and a thickness of about 0.2 mm. The two latter constituents are evenly distributed in the casting mass as prepared.

A quantity of water, usually about 5-8% by weight, is then added to the dry mixture obtained and the wet mixture is used for the manufacture of a refractory safe, there being used as a casting mould a box of steel sheet corresponding to the shape of the safe. The casting mass is introduced into the casting mould in the manner as indicated above, and the safe parts are dried at about 110° C. for a period of time of about 24 hours, the refractory material thereby setting and obtaining a high strength.

The breaking-in safety of the safe in regard to damage by impact, drilling, cutting, blasting, chiselling shows that a hgh degree of breaking-in safety is obtained in addition to the necessary fire protection.

EXAMPLE 2

Casting mass of conventional bond.

In the same manner as in Example 1 there is prepared a casting mass containing the following constituents:

| | | |
|---|---|---|
| Tabular alumina | 5-0 mm | 45 parts by weight |
| Tabular alumina | <14 mesh | 17 parts by weight |
| Tabular alumina | <48 mesh | 10 parts by weight |
| Calcined alumina | <230 mesh | 10 parts by weight |
| CA-25-cement (Alcoa) | | 18 parts by weight |
| Silicon carbide pieces | 5-10 mm | 10 parts by weight |
| Steelfibres having a length of 30 mm and a thickness of 0.2 mm | | 5 parts by weight |

A refractory safe manufactured using this casting mass shows the same high degree of breaking-in safety and fire protecting properties as the safe according to Example 1.

EXAMPLE 3

Example 1 is repeated but using carbon fibers instead of steel fibers, the same high-quality properties of the safe being obtained.

EXAMPLE 4

Example 2 is repeated but using boron carbide instead of silicon carbide, a safe having similar breaking-in safety and similar fire proteciton being obtained as compared to the properties of the safe according to Example 2.

EXAMPLE 5

Example 2 is repeated but using a mixed oxide of aluminum and zirconium called Corhart-Zac ($Al_2O_3$-$ZrO_2$) instead of silicon carbide. Similar properties of the safe are obtained.

EXAMPLE 6

Example 1 is repeated but using abrasite (α-corundum) instead of silicon carbide. A safe having similar breaking-in safety and about the same fire protection is obtained as for the safe obtained according to Example 1.

EXAMPLE 7

Example 2 is repeated but using hard metal scrap from the manufacture of coromant drills. The same advantageous properties of the safe manufactured is obtained as per Example 2.

It should be observed that the invention is not limited to the use of the materials presented in the above examples. Thus, any type of grog material can be used successfully and the character of the binder is not critical. Furthermore, all types of cutting resistance material may be used in the refractory material according to the invention, as well as alternative fibres showing the necessary heat-resistance.

We claim:

1. Refractory material comprising (i) grog in the form of grains or particles selected from the group consisting of alumina, bauxite, kaolin, aluminum silicate, chromite, zircon, zirconia and olivine (ii) a hydraulic binder comprising calcium aluminate cement or chemical binder, (iii) substantially evenly distributed contents of a heat-resistant fibre reinforcement and (iv) a cutting-resistant material having a hardness of at least about 7 as measured according to the Mohs' scale in individual pieces, said pieces having a cross-dimension of at least about 5 mm.

2. The material according to claim 1 wherein the fibre reinforcement is present in an amount of at most about 10% by weight.

3. The material according to claim 2 wherein the fibre reinforcement is constituted by steel or carbon fibres.

4. The material according to claim 1 wherein the fibre reinforcement is constituted by fibres having a length of up to about 10 cm and a thickness of about 0.1–0.5 mm.

5. The material according to claim 1, wherein the binder is selected from the group consisting of calcium-aluminate cement, phosphoric acid and phosphates, silicate cement, colloidal silica and ultra fine silica or alumina having a particle size of less than ten microns.

6. The material according to claim 1 wherein the cutting resistant material is selected from the group consisting of carbides, nitrides, borides, and materials based on $Al_2O_3$.

7. The material according to claim 1 based on (i) $\alpha$-corundum as the alumina grog (ii) calcium-aluminate cement as a binder, (iii) steel fibres having a length of about 2–5 cm and a thickness of about 0.2–0.3 mm as a fibre reinforcement and (iv) carbide pieces having an average cross-dimension of about 10–15 mm as a cutting-resistant material.

8. Unit for storing valuables constructed of a material including the refractory material according to claim 1.

9. Unit for storing valuables according to claim 8 in the form of a bank vault or safe.

10. The material according to claim 1 wherein the pieces have a cross-dimension of 5 to 20 mm.

11. The material according to claim 10 wherein the pieces have a cross-dimension of 10 to 15 mm.

12. The material according to claim 7 wherein said cutting-resistant material is silicon carbide.

13. The material according to claim 6 wherein the cutting resistant material based on $Al_2O_3$ is -$Al_2O_3$.-$ZrO_2$, $\alpha$corundum, beta-corundum, melted mullite or andalusite.

14. The material according to claim 1 wherein the grog is an $\alpha$-corundum.

* * * * *